Patented Nov. 30, 1937

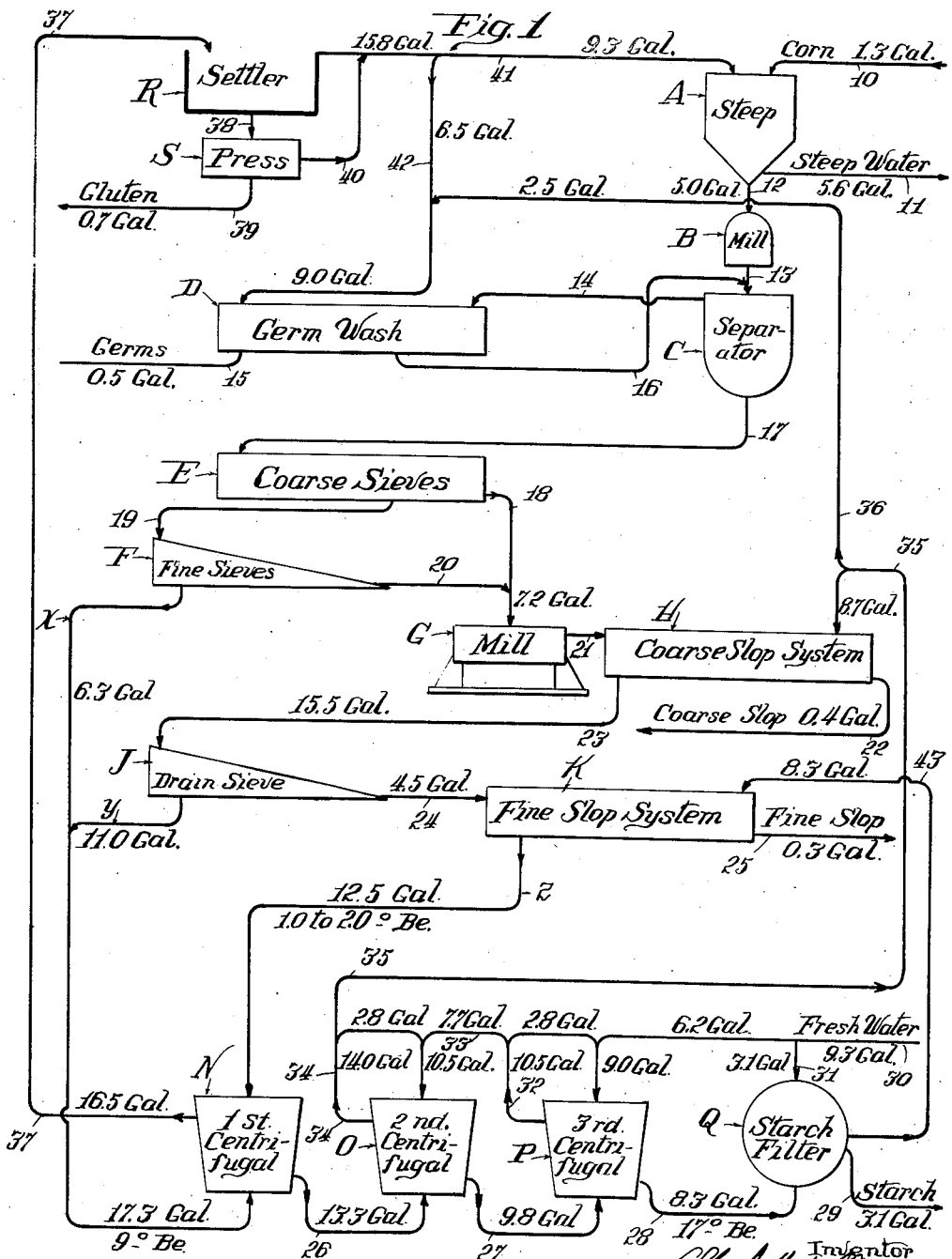

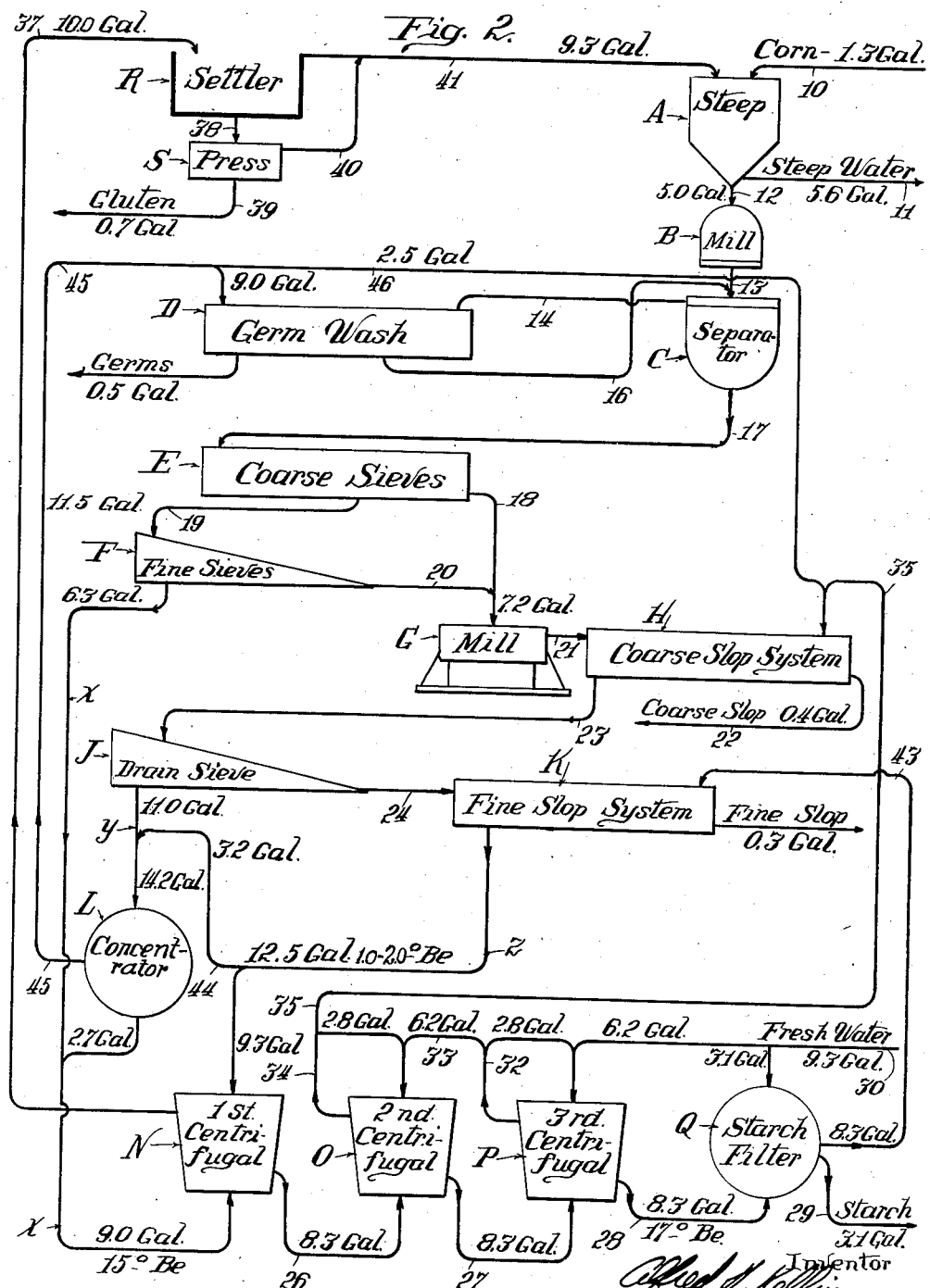

2,100,744

UNITED STATES PATENT OFFICE 2,100,744

MANUFACTURE OF STARCH

Alfred H. Kelling, Chicago, Ill., assignor to International Patents Development Company, Wilmington, Del., a corporation of Delaware Application June 5, 1933, Serial No. 674,365

13 Claims. (Cl. 127—68)

This invention relates to the manufacture of starch and by-products from corn by the wet method; and in particular it relates to methods in which the process waters are used repeatedly, for the most part at least and preferably wholly, so as to save solids, soluble and insoluble, economize water and prevent stream pollution.

This invention specifically provides certain improvements upon the starch making system disclosed in my copending application Serial No. 675,412 filed June 12, 1933, in which the separation between starch and gluten is effected by a series of centrifuging operations through which the starch is carried in one direction by the underflow and the gluten in the other direction by the overflow. Fresh water is introduced as a wash water into the last separating operation, and for the preceding centrifuging operations the wash water consists of overflow from succeeding centrifuging operations. Preferably the wash water enters the starch zone of the centrifugal machine, in each case, and as a consequence the soluble substances and other impurities in the material treated are concentrated with the gluten. The overflow from the first centrifugal is used for steeping corn, preferably after removal of the gluten. The starch stream delivered from the last centrifugal may be dewatered and, if necessary, the starch washed in one or more washing filters; and in such case the filtrates are returned to the separating operations (wet starch system). In a system of this sort the separating operations yield a plurality of streams of starch milk, i. e. water suspensions of starch and gluten, usually one stream from the germ separating operation, one from what is known as the coarse slop system and a third from the fine slop system. The streams from the germ and coarse slop systems contain a larger amount of suspended solid matter and a higher content of solubles than the stream from the fine slop system, that from the germ system which is nearest the point of entry of the corn into the process having the highest content of solubles.

In the pending application referred to, the three streams are united (after a certain amount of water has been eliminated from some of them) and the combined streams subjected to the centrifuging operations referred to. The overflow from the centrifugal system is returned to the steeps because of its relatively high content of solubles and other impurities. The waters from the concentration of the starch and gluten streams and from the dewatering and washing of the starch are re-used in the separating operation, these waters having much lower soluble and impurity contents. The concentration of the starch milk streams is for the purpose of so reducing the overflow from the centrifugal system that all of this overflow may be returned, after settling out of the gluten, to the steeping system.

In the system of the present invention the arrangements are somewhat different with certain resultant advantages. The starch milk streams from the germ and coarse slop separations are united and sent through the centrifugal system without concentration; and the stream from the fine slop system—carrying a minimum amount of solids in suspension and having a minimum soluble content—is used as a wash water in the centrifugal system. The system of the present invention has the advantage of making unnecessary the concentrating step of the application referred to. It has the disadvantage, however, that the overflow from the centrifugal system, the stream carrying the gluten, contains more water—and this is high soluble water—than can be used in the steeps without increasing the draw-off of steep water to an extent perhaps undesirable. Some of the overflow water, so-called gluten water, has to be returned to the wet starch system where an indeterminate amount may remain, through re-circulation, giving rise to impurities, probably of a micro-organic origin, in the starch. However, this may be remedied by a modification of the present system which will be disclosed, in which a part only of the stream from the fine slop system is used as a wash water in the centrifugal operation, the balance and the stream from the coarse slop system being concentrated and mixed with the stream from the germ separation and the combined streams centrifuged as described. In this way the overflow from the centrifugal system is reduced to the water quantity that can be returned to the steeps without increasing the usual steep water draw-off.

The invention is illustrated in the accompanying drawings, in which:

Fig. 1 is a flow sheet diagram of a wet starch process in accordance with the first mentioned form of the invention; and Fig. 2 is a similar flow sheet diagram illustrating the suggested modification.

The same reference characters will be used in the two diagrams so far as the instrumentalities and connections disclosed are the same.

In the following description, the term "pipe" is intended to include any suitable conduit, conveyor or other means for moving the material from point to point in the system. The term "bran" is intended to include the hull fragments, fibre and other cellulosic constituents of the corn. The invention is not confined to any particular form of apparatus. The representations of apparatus in the drawings are wholly diagrammatic.

Referring to Fig. 1, A designates the steeping system which ordinarily consists of a plurality of steep tanks operated on the counter-current principle. B is the mill for breaking up the steeped corn to free the germ, and C is the germ separator. The germs floated off from the liquid in separator C are washed in the germ washing system D. The rest of the grain from the bottom of the separator C is screened through coarse sieves E and fine sieves F, and the tailings from both sieves are ground in mill G. H represents the coarse slop system for separating the coarse bran particles from the material ground in mill G, and I, the fine slop system for removing the finer particles; J being a drain sieve for separating the fine bran particles from the starch milk from the coarse slop system. N, O and P are centrifugals, of which there may be any number, and Q is a filter for dewatering and washing the starch. The gluten settler for removing the gluten from the overflow from the centrifugal system is indicated at R, and S is a press for pressing as much water as possible out of the gluten when taken from the settler.

The operation of the system, together with the connection between the above mentioned apparatuses will next be described. The figures on the drawings followed by the abbreviation "gal." represent gallons of water per bushel of corn ground.

*Operation Fig. 1*

The corn containing 1.3 gallons of water enters the steeping system at 10 and 5.6 gallons of steep water are drawn off at 11 and sent to the evaporators (not shown). The steeped corn carrying 5.0 gallons of water enters the mill B through pipe 12 and the ground material passes to the separator through pipe 13. The germs are floated off from the separator and pass through pipe 14 to the germ wash D; the germs being discharged at 15 with 0.5 gallon of water. Water from the germ system passes through pipe 16 to the separator to maintain a proper amount of separating fluid of the right density in the separator. The rest of the corn passes from the separator C through pipe 17 to the coarse sieves E, the tailings from which pass through pipe 18 to the mill G while the liquid passes through pipe 19 to the fine sieves F. The liquid from the fine sieves consisting of 6.3 gallons of water carrying starch and gluten in suspension, (starch milk) passes from the fine sieves into the pipe $x$, leading to the centrifugal system. The tailings from the fine sieves F pass through pipe 20 to pipe 18 and thence to the mill G, 7.2 gallons of water entering the mill with the corn material. The material fine ground in the mill G passes through pipe 21 to the coarse slop system from which the coarse slop is discharged at 22 carrying 0.4 gallon of water. The liquid from the coarse slop system H, 15.5 gallons, passes through pipe 23 to the drain sieve J. The liquid (starch milk) from the drain sieve J (11.0 gallons) enters a pipe $y$ which joins pipe $x$. The tailings from the drain sieve J, containing 4.5 gallons of water, pass through pipe 24 to the fine slop system K, from which the fine slop is discharged at 25 containing 0.3 gallon of water. The starch milk from the fine slop system K enters the pipe $z$.

The starch milk in $x$ will contain more starch and gluten per gallon and also solubles than the starch milk in $y$, and the starch milk in $y$ will contain more than that in $z$. The $x$ and $y$ streams join, containing 17.3 gallons of water which are introduced into the first centrifugal machine N, the density of the liquid being approximately 9° Baumé. This material is washed by the light starch milk in $z$ (which may have a density of 1.0° to 2.0° Baumé) and by fresh water as will be described. The centrifugal machines are of a known type having two discharges, one for the overflow—the water with the low specific gravity particles, the gluten—and the other for the underflow—the water stream carrying the heavy particles, the starch. Provision is made for introducing the wash liquid into the starch zone of the machine. This liquid acts as a diluent and also as displacing fluid, apparently, with the result that in the counter-current arrangement of the centrifugals shown in the drawings, the solubles are concentrated, in a large measure in the outflowing gluten stream, the starch stream discharged from the third centrifugal being comparatively free from soluble substances, as well as from gluten. The underflow from centrifugal N, containing 13.3 gallons of water passes through pipe 26 to centrifugal O and the underflow from centrifugal O, 9.8 gallons, passes through pipe 27 to centrifugal P. The underflow from centrifugal P, 8.3 gallons, passes through pipe 28 to the starch filter. With the water balance arrangement shown, this stream will have a density of 17° Baumé. The starch is first dewatered in the starch filter Q, which may be a vacuum or pressure filter of the displacement type, the starch being discharged from the system at 29 containing 3.1 gallons of water.

The system is supplied with 9.3 gallons of fresh water through pipe 30. 3.1 gallons goes through branch pipe 31 to starch filter Q and 6.2 gallons into the starch zone of the third centrifugal P. The overflow from the third centrifugal through pipe 32 is 10.5 gallons, 2.8 gallons of which goes back to pipe 30 and into the wash water channel of centrifugal P, making in all 9.0 gallons of wash water used in the third centrifugal. The balance of the overflow from centrifugal P, 7.7 gallons, goes through branch pipe 33 to the second centrifugal, 2.8 gallons going through pipe 34, back to the wash water channel of this same centrifugal (making 10.5 gallons of wash water in all), 8.7 gallons going through pipe 35 to the coarse slop system and 2.5 gallons through the branch pipe 36 to the germ wash. The partial run around provided by branches from pipes 32 and 34 gives an increased dilution throughout the system which tends to make the separation as between starch and gluten more complete, at the expense of a higher soluble content in the starch, which could be corrected, however, if necessary by giving the starch an additional wash in a second filter.

The wash water for the first centrifugal N consists of the light starch milk, 12.5 gallons, discharged through pipe $z$ from the fine slop system. The overflow from the first centrifugal N, 16.5 gallons, is passed through pipe 37 to the gluten settler R, and passes out of the settler through pipe 38 to the gluten press S, from which the gluten is withdrawn at 39 with 0.7 gallon of water. The water from the press passes through pipe 40 to the overflow pipe 41 of the gluten settler which leads to the steep A. The total amount of water from the settler and press is 15.8 gallons, of which 9.3 gallons goes to the steeps and 6.5 gallons through pipe 42 to pipe 36 and germ wash, making in all 9.0 gallons of water delivered to the germ wash. Filtrate from the starch filter Q, 8.3 gallons, derived from the dewatering and washing of the starch, is returned to the fine slop system K through pipe 43.

It will be observed that the waters heaviest in solubles are used in the system at points as near as possible to the place of exit of the process water from the system, namely the steeps. The overflow water from the centrifugal system, which has the maximum soluble concentration is used, as far as possible, in the steeps, and the rest of it in the germ wash. The overflow from the second centrifugal, next heaviest in solubles, goes to the coarse slop system and the starch wash water which contains the smallest amount of soluble substances is used in the fine slop system. This arrangement aims at shortening the time that any process water can remain in the system in proportion to the soluble content of such water; the higher the soluble content of the water, the shorter time it remains in the process.

The expedient of returning a portion of the overflow to the centrifugal from which it came is not specifically claimed in this application, but has been made the subject matter of application 83,536, filed June 4, 1936. Likewise, any disclosures of this application which are common to the other forms disclosed in aforementioned application Serial No. 675,412, filed June 12, 1933, are not specifically claimed herein but are claimed broadly in said application 675,412 and more specifically in other divisions of said application.

Method of Fig. 2

The possible objection to returning part of the overflow from the first centrifugal to the wet starch system, through the germ system, which is involved in the arrangements just described, is not present in the modified system of Fig. 2. The apparatuses shown in Fig. 2 are the same as those in Fig. 1, with the exception that Fig. 2 provides, additionally, a concentrator L. The connections between these apparatuses are the same except for the following changes: The concentrator L (which may be the dewatering filter, settling tank or any other suitable device for eliminating water) is arranged in the pipe y leading from the drain sieve J, and which carries the starch milk from the coarse slop system. The pipe z leads from the fine slop system to the first centrifugal N, but it delivers only 9.3 gallons as wash water to the centrifugal, the balance of the starch milk from the fine wash, 3.2 gallons, passing through the pipe 44 to the pipe y and thence into the concentrator. This with 11.0 gallons in the y stream makes 14.2 gallons entering the concentrator. Of this 11.5 gallons of water are removed and pass through pipe 45, 9.0 gallons going to the germ wash and 2.5 gallons through branch pipe 46 to the coarse slop system, the gallonage in pipe y is reduced to 2.7 and this with the 6.3 gallons from the x stream makes 9 gallons delivered to the first centrifugal. The volumes of water in the centrifugal system are less than in the Fig. 1 arrangement, the same number of gallons of underflow being discharged at the same Baumé. Only 10 gallons of overflow go from the first centrifugal to the settler R, which reduces the overflow to pipe 41 to 9.3 gallons, all of which is used in the steeps.

The modification shown in Fig. 2, while covered by the broader claims herein is not specifically claimed in this application, but has been made the subject matter of divisional application 83,540, filed June 4, 1936.

Other modifications will occur to those skilled in this art. It is the intention to cover all changes made in the disclosed systems within the scope of the appended claims.

I claim:

1. In the manufacture of starch from corn, in which the corn in a comminuted state, is subjected to a series of separating operations, for removal of germ and bran, yielding a plurality of mixtures of starch, gluten and water; the improvement which comprises centrifuging the starch and gluten suspension from the first separating operation of the series to remove the gluten from the starch; and using, as wash water in said centrifuging operation, the starch and gluten suspension from a later separating operation of said series.

2. In the manufacture of starch from corn, in which the corn in a comminuted state, is subjected to a series of separating operations, for removal of germ and bran, yielding a plurality of mixtures of starch, gluten and water of differing densities: the improvement which comprises centrifuging a starch and gluten suspension from said separating operations having a high density; and using, as a wash water in said centrifuging operation, a starch and gluten suspension derived from said separating operations having a lower density.

3. In the manufacture of starch from corn, in which the corn in a comminuted state, is subjected to a series of separating operations, for removal of germ and bran, yielding a plurality of mixtures of starch, gluten and water: the improvement which comprises subjecting one of said mixtures to a series of centrifuging operations through which the underflow carrying the starch is moved in one direction and the overflow carrying the gluten in the other; and introducing another of said starch and gluten mixtures into the starch zone of one of said centrifuging operations.

4. In the manufacture of starch from corn, in which the corn in a comminuted state, is subjected to a series of separating operations, for removal of germ and bran, yielding a plurality of mixtures of starch, gluten and water of different densities: the improvement which comprises subjecting a starch and gluten suspension from said separating operations having a relatively high density to a plurality of centrifuging operations, through which the underflow carrying the starch moves in one direction and the overflow carrying the gluten in the other direction, and introducing a starch and gluten suspension from said separating operations, having a lower density, into the starch zone of the first of said centrifuging operations, and fresh water into the starch zone of the last of said centrifuging operations.

5. In the manufacture of starch from corn, in which the corn in a comminuted state, is subjected to a series of separating operations, for removal of germ and bran, yielding a plurality of mixtures of starch, gluten and water of different densities: the improvement which comprises subjecting a starch and gluten suspension from said separating operations having a relatively high density, to a plurality of centrifuging operations, through which the underflow carrying the starch moves in one direction and the overflow carrying the gluten in the other direction; and introducing a starch and gluten suspension from said separating operations having a lower density into the starch zone of the first of said centrifuging operations, fresh water into the starch zone of the last of said centrifuging operations, and overflow from the last centrifuging operation into the starch zone of the intermediate centrifuging operation.

6. In the manufacture of starch from corn, in which the corn in a comminuted state, is subjected to a series of separating operations, for removal of germ and bran, yielding a plurality of mixtures of starch, gluten and water: the improvement which comprises centrifuging the starch and gluten suspension from the first separating operation of the series to remove the gluten from the starch; and introducing into the starch zone of said centrifuging operation starch and gluten suspension from a later separating operation of said series.

7. In the manufacture of starch from corn in which the starch in a comminuted state is subjected in water to germ, coarse slop and fine slop separating operations, yielding separate streams of starch, gluten and water: the improvement which comprises centrifuging the streams from the germ and coarse slop separations to remove the gluten from the starch; and using the stream from the fine slop separation as a wash water in the aforesaid centrifuging operation.

8. In the manufacture of starch from corn in which the starch in a comminuted state is subjected in water to germ, coarse slop and fine slop separating operations, yielding separate streams of starch, gluten and water: the improvement which comprises centrifuging the streams from the germ and coarse slop separations to remove the gluten from the starch; and introducing the stream from the fine slop separation into the starch zone of said centrifuging operation.

9. In the manufacture of starch from corn comprising steeping the corn, subjecting it to a series of separating operations in water to remove the germ and bran from the starch and gluten, yielding a plurality of starch, gluten and water suspensions and in which substantially all process waters except steep water and water absorbed in the discharged solids are reused in the process on subsequently treated corn material: the improvement which consists in subjecting the starch and gluten suspension from the first separating operations of said series to a plurality of centrifuging operations through which the underflow carrying the starch moves in one direction and the overflow carrying the gluten moves in the other direction; utilizing as wash water in said centrifuging operations the starch and gluten suspensions from the later separating operations of said series; re-using water in the overflow from said centrifuging operations for steeping corn as the operations are continued on such material; and using the rest of the process waters for separating operations on the comminuted corn.

10. In the manufacture of starch from corn in which the corn is steeped and subjected in a comminuted state to separating operations in water for removal of the germ, coarse slop and fine slop, yielding separate streams of starch, gluten and water and in which substantially all process waters except steep water and water absorbed in the discharged solids are reused in the process on subsequently treated corn material: the improvement which comprises centrifuging the starch, gluten and water streams from the germ and coarse slop separations to remove the gluten from the starch; using the stream from the fine slop separation as a wash water in said centrifuging operations; utilizing water in the overflow from said centrifuging operation for steeping corn as the operations are continued on such material; and using the rest of the process waters for separating operations on comminuted corn.

11. In the manufacture of starch from corn in which the corn is steeped and subjected in a comminuted state to separating operations in water for removal of the germ, coarse slop and fine slop, yielding separate streams of starch, gluten and water and in which substantially all process waters except steep water and water absorbed in the discharged solids are reused in the process on subsequently treated corn material: the improvement which consists in subjecting the starch, gluten and water streams from the germ and coarse slop separations to a series of centrifuging operations through which the underflow carrying the starch moves in one direction and the overflow carrying the gluten in the other direction; using the stream from the fine slop separation as a wash water in the first of said centrifuging operations; using fresh water as a wash water in the last of said centrifuging operations; utilizing water from the overflow from the first centrifuging operation for steeping corn as the operations are continued on such material; and using the overflow from another of said centrifuging operations in the separating operations on the comminuted corn.

12. Method of separating starch from gluten which comprises subjecting a water mixture of the starch and gluten to a series of centrifuging operations in which the underflow, carrying the starch, and the overflow, carrying the gluten, move in contrary directions, introducing a starch and gluten mixture, as a wash water, into the first of said operations performed on the first mentioned starch and gluten mixture, and using fresh water, as a wash water, in subsequent centrifuging operations of the series.

13. Method of separating starch from gluten which comprises subjecting a water mixture of the starch and gluten to a series of centrifuging operations in which the underflow, carrying the starch, and the overflow, carrying the gluten, move in contrary directions, introducing a starch and gluten mixture, as a wash water, into the first of said operations performed on the first mentioned starch and gluten mixture, using fresh water, as a wash water, in subsequent centrifuging operations of the series, and in the operations using fresh water as a wash water diverting a part of the overflow from each operation back to the operation from which it came.

ALFRED H. KELLING.